United States Patent [19]

Gerfast

[11] Patent Number: 4,814,654
[45] Date of Patent: Mar. 21, 1989

[54] STATOR OR ROTOR BASED ON PERMANENT MAGNET SEGMENTS

[76] Inventor: Sten R. Gerfast, 1802 Valley Rd., Mendota Heights, Minn. 55118

[21] Appl. No.: 660,523

[22] Filed: Oct. 12, 1984

[51] Int. Cl.$^4$ .............................................. H02K 21/00
[52] U.S. Cl. .................................. 310/154; 310/156; 310/268
[58] Field of Search ................................ 310/162–165, 310/268

[56] References Cited

U.S. PATENT DOCUMENTS

| | | | |
|---|---|---|---|
| 3,219,861 | 11/1965 | Burn | 310/268 |
| 3,230,406 | 1/1966 | Henry-Baudot | 310/156 X |
| 3,231,770 | 1/1966 | Hyde | 310/156 |
| 3,249,780 | 5/1966 | Ibrahim et al. | 310/154 |
| 3,304,598 | 2/1967 | Henry-Baudot | 310/268 X |
| 3,331,973 | 7/1967 | McClure | 310/268 X |

Primary Examiner—Mark O. Budd
Attorney, Agent, or Firm—Robert E. Grandrud

[57] ABSTRACT

The novel rotor or stator comprises a symmetrical assembly of permanent-magnet segments, the working faces of which are separated. Each segment is magnetized to have one pole extending across one-half of its working face and the opposite pole extending across the other half. Because adjacent halves of adjacent working faces have like polarity, it appears that flux emanating from the segments between adjacent magnet segments is redirected more orthogonally with respect to the working faces, thus enhancing efficiency. The segments may either be parts of a single permanent magnet or individual pieces, and their working faces may together define either a cylinder or a plane.

10 Claims, 1 Drawing Sheet

STATOR OR ROTOR BASED ON PERMANENT MAGNET SEGMENTS

CROSS REFERENCE TO RELATED APPLICATION

The novel permanent-magnet stator or rotor is particularly useful when combined with a rotor or stator of applicant's application entitled "Ironless Coil Rotor or Stator", Ser. No. 660,524, filed Oct. 12, 1984, of even date herewith (which has been abondoned in favor of Ser. No. 870,432, filed June 4, 1986, that has been abandoned in favor of Ser. No. 229,137, filed Aug. 5, 1988).

FIELD OF THE INVENTION

The invention concerns dynamoelectric machines, specifically motors and generators (including alternators) wherein either the rotor or stator component comprises permanent magnet segments.

BACKGROUND ART

In most rotors or stators based on permanent magnets, the magnets are annular and have cylindrically shaped inner and outer faces which usually form complete coaxial cylinders, but occasionally the magnets are segmented. In the former case, the annular magnet is magnetized to have at an air gap alternating north and south poles extending across its working face. In the latter case, the magnet segments are usually magnetized to have one pole extending completely across the working face of each segment and the opposite pole extending completely across each working face of adjacent segments. See "Permanent Magnet Motors, Generators and Alternators" by James B. Gollhardt, Publication SPF5 of Allen-Bradley, Magnetics Division, Shawnee, OK, dated September 1983, which in FIG. 1 shows a motor component comprising two permanent magnet segments, each magnetized to have one pole extending across a working face at an air gap; in FIGS. 20 and 22, motor components having 2, 4, 8 and 12 magnet segments, each magnetized to have one pole across its working face at an air gap; and in FIG. 6, several permanent magnets, one of which forms a complete cylinder and typically would be magnetized to have one north and one south pole, each extending across 180° of its working face at an air gap.

U.S. Pat. No. 3,231,770 (Hyde) shows in FIG. 8 a flexible permanent magnet strip 22 which is bent to form a complete cylinder as seen in FIGS. 4 and 5 and is magnetized to have a large number of alternating north and south poles extending across its working face at an air gap.

A few rotors or stators which have planar air gaps employ permanent magnets, the working faces of which lie in planes. For example, see "DC Motors", 5th Ed., 1980, an engineering handbook of Electro-Craft Corp., Hopkins, MN, FIG. 2.8.1 of which shows a pair of stators, each having eight cylindrical permanent magnets, each having a flat working face at an air gap. Although not disclosed, it is understood that the working faces of adjacent magnets have alternating north and south poles. The stator of the dynamoelectric machine shown in FIGS. 1–4 of U.S. Pat. No. 3,144,574 (Henry-Baudot) also employs a plurality of cylindrical magnets, each provided with a pole piece in the form of a sector of an annulus, which in effect displaces to an air gap the working face of its magnet (col. 2, lines 21–25).

DISCLOSURE OF INVENTION

The invention provides for a dynamoelectric machine a rotor or stator component which like permanent-magnet-segment components of each item of the above-cited prior art comprises a symmetrical assembly of an even number of identical permanent-magnet segments having at an air gap working faces which are separated from each other. However, the rotor or stator component of the invention provides enhanced efficiency by virtue of the manner in which those permanent-magnet segments are magnetized. That is, each permanent-magnet segment is magnetized to have
    one pole extending across one-half of its working face,
    the opposite pole extending across the other half of its working face, and
    adjacent halves of adjacent working faces having like polarity.

Dynamoelectric machines employing the novel permanent magnet rotor or stator component have been found to be more efficient than are those of the prior art which employ an array of alternately magnetized permanent-magnet segments. While the reason for the increased efficiency is not fully understood, it is believed to result from the repulsion across the gap between adjacent magnet segments, which repulsion redirects magnetic flux from magnet surfaces between the working faces generally orthogonally with respect to the working faces of the magnet segments. If so, this more orthogonally directed flux may more effectively interact with magnetic flux associated with the other component of the dynamoelectric machine.

It is believed to be immaterial whether or not the there is any spacing between the segments in areas remote from their working faces, or whether the segments are individual magnets or part of a single permanent magnet. Relatively large spacings can provide a volume saving of magnet material that can be important when using expensive materials such as rare earth magnet materials. For economy, a single segmented permanent magnet can be molded from a dispersion of magnetic particles in a nonmagnetic binder.

THE DRAWING

Figure 1:
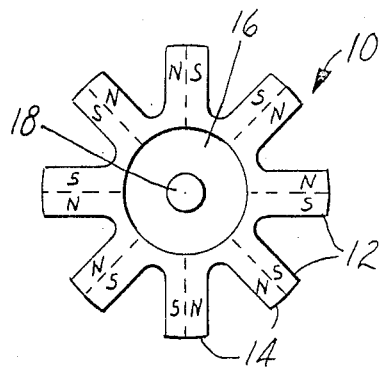
FIG. 1 is a schematic plan view of a permanent-magnet rotor of the invention.

The rotor 10 shown in FIG. 1 has eight permanent-magnet segments 12, each of which is magnetized to have one north pole extending across one-half of its working face 14 and one south pole extending across the other half. Adjacent halves of adjacent segments 12 have like polarity. Because of the magnetic repulsion across the gap between adjacent segments, it is believed that magnetic flux emanating from the segments 12 between their working faces 14 extends generally radially and orthogonally to the cylinder defined by the working faces. When the rotor 10 is a single permanent magnet, it may be magnetized by running a large copper wire in alternate directions through the gaps between the segments, and then passing a large electrical discharge through the wire.

A prototype of the rotor 10 has been made by separately magnetizing and then adhering eight individual permanent magnets to an aluminum drum 16 having a steel shaft 18. Each of the eight magnets had been molded from a composition of barium ferrite platelets dispersed in a flexible matrix.

Figure 2:
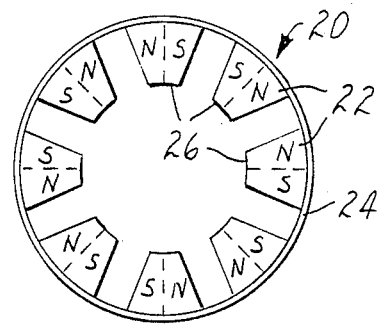
FIG. 2 is a schematic plan view of a permanent-magnet stator of the invention.

The stator 20 shown in FIG. 2 has eight permanent-magnet segments 22 adhered to the cylindrical inner face of a nonmagnetic tube 24. Each of the segments has been magnetized to have one pole extending across one-half of its working face 26 and the opposite pole extending across the other half. Adjacent halves of adjacent working faces 26 have like polarity.

Figure 3:
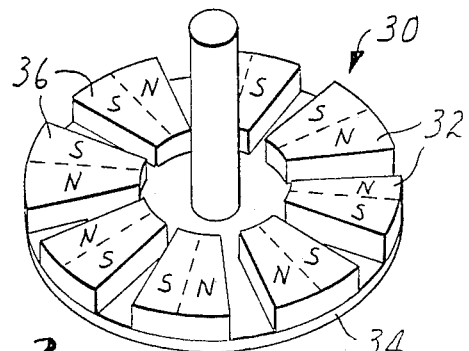
FIG. 3 is a schematic perspective view of a second permanent-magnet rotor of the invention.

The rotor 30 shown in FIG. 3 has eight permanent-magnet segments 32 which are adhered to an aluminum panel 34 so that the working face 36 of every segment lies in the same plane to cooperate with a stator which also has planar working faces.

I claim:

1. A permanent magnet rotor or stator component for a dynamoelectric machine, said component comprising a symmetrical assembly of an even number of identical permanent-magnet segments having at an air gap working faces which are separated from each other, wherein the improvement comprises:

each permanent-magnet segment is magnetized to have
   one pole extending across one-half of its working face,
   the opposite pole extending across the other half of its working face, and
 adjacent halves of adjacent working faces having like polarity.

2. A permanent-magnet component as defined in claim 1 wherein each of said segments is spaced from adjacent segments.

3. A permanent-magnet component as defined in claim 1 wherein adjacent segments contact each other in areas remote from their working faces.

4. A permanent-magnet component as defined in claim 2 wherein each segment is a molded permanent magnet.

5. A permanent-magnet component as defined in claim 4 wherein each molded permanent magnet comprises magnetic particles dispersed in a flexible binder.

6. A permanent-magnet component as defined in claim 1 wherein each of the segments is part of a single permanent magnet.

7. A permanent-magnet component as defined in claim 1 wherein the working faces of the magnet segments together form a cylinder.

8. A permanent magnet component as defined in claim 1 wherein the working faces of the magnet segments lie in a plane.

9. A dynamoelectric machine, one rotor or stator component of which is a permanent-magnet component as defined in claim 1.

10. A permanent-magnet component as defined in claim 3 wherein each segment is an individual permanent magnet.

* * * * *